United States Patent

Isaacson

[15] 3,701,235
[45] Oct. 31, 1972

[54] METHOD OF AND APPARATUS FOR TREATING A GAS TO REMOVE FOREIGN CONSTITUENTS THEREFROM

[72] Inventor: Boris Isaacson, 14532 Vanowen, Van Nuys, Calif. 91405

[22] Filed: Oct. 26, 1970

[21] Appl. No.: 83,735

[52] U.S. Cl. ..........................55/84, 55/220, 55/257, 55/473, 261/118
[51] Int. Cl. ............................................B01d 47/06
[58] Field of Search......55/93, 94, 227, 84, 228, 220, 55/257, 356, 385, 435, 473; 261/118, 119, 72, 74; 98/33, 30, 32; 128/1 B

[56] References Cited

UNITED STATES PATENTS

| R26,183 | 4/1967 | Morrell | 98/33 R |
| 1,471,112 | 10/1923 | Ellis | 55/228 |
| 3,272,199 | 9/1966 | Matthews | 128/1 B |
| 3,521,546 | 7/1970 | Day | 98/32 |

*Primary Examiner*—Bernard Nozick
*Attorney*—Robert Louis Finkel

[57] ABSTRACT

A method of and apparatus for treating a gas to remove foreign constituents from the gas by inducing flow of the gas through and inflatable treatment chamber constructed of a thin plastic film in a manner such as to effect inflation of the chamber by gas pressure, and washing, drying, and or otherwise treating the gas during its flow through the chamber to remove the foreign constituents for the gas. Primary applications of the invention involve the treatment of atmospheric air to remove therefrom dust, smog, fog, and or other foreign constituents. In these primary applications, the inflatable treatment chamber may be installed on level ground, on building tops, in natural or artificial ravines, such as washes or storm drains, or in natural or artificial tunnels, such as sewer tunnels having openings to the atmosphere.

6 Claims, 3 Drawing Figures

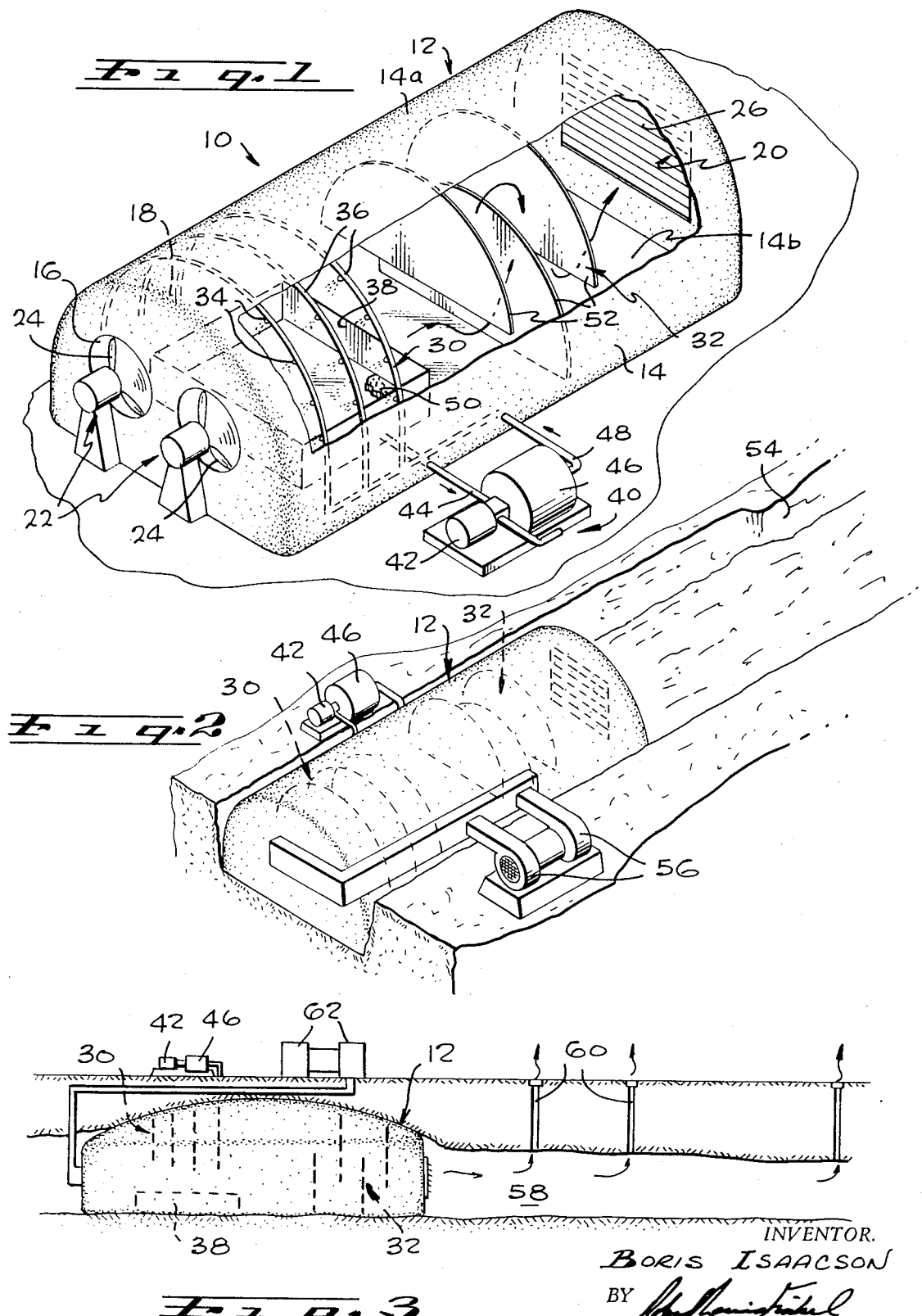

METHOD OF AND APPARATUS FOR TREATING A GAS TO REMOVE FOREIGN CONSTITUENTS THEREFROM

BACKGROUND OF THE INVENTION

1. Field of the Invention

This invention relates generally to the field of gas purification. More particularly, the invention relates to a method of an apparatus for treating a gas, such as atmospheric air, to remove foreign constituents from the gas.

2. Prior Art

As will appear from the ensuing description, the gas treatment method and apparatus of the invention may be employed to remove a variety of foreign constituents from virtually any any gas. However, the invention is primarily concerned with and will be described in relation to the removal of foreign constituents, such as dust, smog, fog, and the like, from atmospheric air. It is significant to note at the outset that in the context of the present disclosure, the expression "a foreign constituent" is intended to encompass any constituents entrained in the air or gas being treated.

Air pollution has become a major problem throughout the world. As a consequence, increasing emphasis is being placed on the development of methods and devices to prevent the introduction of pollutents into the atmosphere and to remove pollutents from the atmosphere. Prevention of atmospheric pollution involves the improvement of the major sources of such pollution, such as automotive vehicle engines, industrial facilities, and the like, to reduce or eliminate the contaminates which these sources emit. The present invention is concerned primarily with the immediate problem of removing pollutents from the atmosphere.

A variety of methods and devices have been devised to remove pollutents from the atmosphere. One of these techniques involves inducing flow of atmospheric air through a treatment chamber, and treating the air as it passes through the chamber to remove the major pollutents which are dust and smog. This air treatment commonly consists of washing and then drying the air. By way of example, an air washer or scrubber for this purpose is disclosed in U.S. Pat. No. 3,406,498.

The existing air washing methods and apparatus of this type are characterized by certain deficiencies which this invention overcomes. These deficiencies stem, in large part, from the fact that the existing air washing devices employ an air treatment or washing chamber of rigid, heavy metal construction. As a consequence, such equipment is quite costly, heavy, and difficult to transport and install. Moreover, in order to keep the above factors within practical limits, the equipment must be made quite small. As a consequence, such equipment provides only a relatively short residence time of the air within the treatment chamber and relatively low volumetric air flow rates through the chamber. Such residence time and volumetric flow rates are well below those necessary for large scale atmospheric purification applications. Another disadvantage of the existing air washing equipment resides in the fact that it constitutes, in most cases, at least a semi-permanent installation which is totally incapable of being quickly and easily erected and then collapsed, when necessary, for transportation from one location to another.

At this point, it is significant to recall that while the invention is concerned primarily with the removal of pollutents from the atmosphere, the present method and apparatus are susceptible of general application in the field of gas treatment to remove foreign constituents from the gas. Most if not all gas treatment apparatus of this kind which is presently available is subject to the same and/or other disadvantages as the air washing apparatus described above.

SUMMARY OF THE INVENTION

The present invention provides an improved gas treatment method and apparatus of the type described which avoid the above and other disadvantages of the existing methods and devices of this kind. As noted the present method and apparatus are intended primarily for and will be disclosed in connection with the removal in the atmosphere of such foreign constituents as dust, smog, fog, and the like. As will appear from the ensuing description, the fog removal or dispersal capability of the present invention provides a substantial potential economic benefit when applied to the task of removing fog from the vicinity of major airports.

According to the present invention, the gas to be treated is induced to flow through an inflatable treatment chamber having a wall constructed of a thin plastic film, in a manner such that the chamber is inflated by gas pressure. The gas enters the chamber through an inlet in the chamber wall and exits from the chamber through an outlet in the wall. The gas is forced into the chamber through the inlet by means of fans, blowers, or the like, and the rate of gas discharge from the chamber through the outlet is regulated, all in such a way that the gas pressure within the chamber is sufficient to maintain the chamber in its inflated configuration. Contained within the treatment chamber, between the inlet and the outlet, are means for treating the gas flowing through the chamber in such as way as to remove the foreign constituents from the gas. In the disclosed embodiments of the invention, this gas treatment means comprises nozzles for jetting multiple sprays of washing liquid across the gas stream flowing through the chamber and following baffles for drying the gas.

As noted earlier, the primary application of the invention involves the treatment of atmospheric air to remove from the air such foreign constituents as dust, smog, and/or fog. In this application, the inlet and outlet of the treatment chamber open to the atmosphere, such that the contaminated air is drawn from the atmosphere into the chamber and the clear dry air is discharged from the chamber back to the atmosphere. According to a feature of the invention, the treatment chamber may be installed on level ground, or within a natural or artificial ravine, such as a wash or storm drain or within a natural or artificial subterranean tunnel, such as a sewer tunnel, having openings to the surface.

Primary advantages of the present gas treatment apparatus reside in its relative simplicity, low cost, lightweight, collapsibility for storage, transportation from one location to another, or other reasons, and ease of manufacture and installation. Another important feature of the invention resides in the fact that the novel inflatable construction of the treatment chamber enables the latter to be made sufficiently large to provide the relatively long residence time of gas within the chamber and high volumetric gas flow rates required for large scale gas purification applications, such as large scale smog and fog removal applications.

BRIEF DESCRIPTION OF THE DRAWINGS

FIG. 1 is a perspective view of a present gas treatment apparatus which, in this instance, is designed for removing pollutents from the atmosphere;

FIG. 2 illustrates one possible installation of the gas treatment apparatus of FIG. 1, wherein the inflatable treatment chamber is installed within a ravine, such as a wash or storm drain; and FIG. 3 illustrates another possible installation of the treatment apparatus wherein the inflatable treatment chamber is installed within a tunnel, such as a sewer tunnel.

DESCRIPTION OF THE PREFERRED EMBODIMENTS

FIG. 1 illustrates a gas treatment apparatus 10 according to the invention for treating a gas to remove foreign constituents therefrom. In this regard, it is significant to recall that in the context of the present disclosure, the expression "foreign constituents" is intended to encompass any constituents entrained within the gas being treated. The particular inventive embodiment selected for illustration in FIG. 1 is designed for treating atmospheric air to remove such foreign constituents as dust, smog, and the like.

The treatment apparatus 10 has an elongate inflatable treatment chamber 12 with a wall 14 constructed of a thin plastic film. At one end of the chamber is an inlet 16 through which air to be treated enters the interior chamber passage 18. At the opposite end of the chamber is an outlet 20 through which the treated air emerges from the passage. The plastic tunnel wall 14 completely surrounds the tunnel passage 18 circumferentially and includes an upper, generally semi-cylindrical wall portion 14a and a lower, flat bottom wall portion or floor 14b. However, it will become readily evident as the description proceeds at the present inflatable treatment chamber may have other cross-sectional configurations and that the floor of the chamber may be furnished other than by the plastic tunnel wall. For example, the chamber floor may comprise a relatively rigid floor member of any suitable material.

Associated with the treatment chamber 12 are means 22 for inducing air flow through the chamber from its inlet 16 to its outlet 20 in a manner such as to maintain the chamber in its illustrated inflated configuration under the action of the air pressure within the chamber. The illustrated air flow inducing means 22 comprise blowers or fans 24 within the chamber inlet 16 for driving air into the chamber through the inlet, and adjustable shutters 26 in the chamber outlet 20 for regulating air flow from the chamber. The rate of air flow into and from the chamber is regulated to maintain the air within the chamber at the proper chamber inflation pressure.

Located within the chamber passage 18, between the inlet 16 and outlet 20, are means for treating the air stream flowing through the chamber to remove foreign constituents from the air. The particular air treatment means shown comprise initial air washing means 30 adjacent the inlets and following drying means 32 adjacent the outlet. Air washing means 30 include sets of spray nozzles 34 for jetting across the air stream flowing through the chamber high velocity sprays of water and/or other chemical washing liquid. These nozzles are carried by arcuate headers 36 which are supported on the chamber floor 14b and arch over the chamber passage 18. Situated on the chamber floor, below the nozzles so as to collect the liquid discharge from the nozzles, is a collection tank 38.

A liquid supply system 40 is connected to the headers 36 for supplying the nozzles 34 with water and/or other chemical washing liquid under pressure. In this case, the liquid supply system 40 is a pumping system connected between the headers 36 and the collection tank 38 for recirculating wash liquid under pressure from the tank to the nozzles. This pumping system includes a pump 42 having its intake connected to the collection tank through a suction line 44 and its discharge connected to the nozzle headers 36 through a filter 46 and a discharge line 48. If desired, the collection tank 38 may contain filtration means 50 for filtering the washing liquid within the tank.

The air drying means 32 may comprise any means capable of drying, to the desired low saturation level, the washed air emerging from the air washing means 30. The particular drying means shown consists of absorbant baffles 52 arranged in the staggered configuration illustrated so as to define a tortuous flow path for the air. On flowing through this flow path, the moist air from the air washing means 30 impinges the baffles a number of times, such that a major portion of the water content of the air is removed. It is evident, of course, that additional drying baffles may be provided. The clean relatively dry air emerging from the air drying means 32 exits from the drying chamber through the shuttered outlet 20.

As noted earlier, the present air treatment or washing apparatus may be installed in various locations. The apparatus of FIG. 1, for example, is installed on level ground. FIGS. 2 and 3 illustrate two other possible installations for the apparatus.

In FIG. 2, the inflatable treatment chamber 12 is installed within a natural or artificial ravine 54, such as a wash or storm drain. The means for inducing air flow into the treatment chamber comprises blowers 56 mounted on the surface at one side of the ravine. The wash liquid recirculating pump 42 and its filter 46 are mounted on the surface at the opposite side of the ravine. These locations of the blowers, pump and filter outside of the ravine are desireable for two reasons. First, the blowers, pump, and filter are then readily accessible for servicing and repair, when necessary. Secondly, the blowers, pump, and filter are isolated from any water flow which may occur through the ravine during a rain. This not only prevents damage to these components, but prevents the latter from blocking water flow through the ravine.

In this latter regard, it is significant to note that one advantage of the inflatable construction of the treatment chamber 12 resides in the fact that it may be anchored to the floor of the ravine 54 and deflated, when necessary, to permit water flow through the ravine. It will be understood, of course, that the nozzle headers 36 and air drying baffles 52 are collapsible within or removable from the treatment chamber to permit deflation of the chamber under these conditions.

In FIG. 3, the air treatment chamber 12 is installed within a natural or artificial subterranean tunnel 58 having openings 60 to the surface through which cleansed air may flow from the chamber to the atmosphere. The particular subterranean tunnel shown is a typical storm drain, wherein the surface openings 60 are the street drains of the storm drainage system. As in FIG. 2, the blowers 62 for inducing air flow through the treatment chamber and the wash liquid pump 42 and filter 46 are preferably located outside of the tunnel passage 58 so as to be isolated from water flow through the passage. As before, the treatment chamber 12 may be arranged for deflation, when necessary to permit water flow through the tunnel.

As noted earlier, the present air treatment or washing apparatus may be utilized to remove various foreign constituents from the atmosphere. One major use of the apparatus, for example, involves removal of dust, smog, and other atmospheric contaminates. Another major use involves removal or dispersal of fog from the atmosphere, particularly in the vicinity of airports. This latter use of the apparatus offers a particularly great economic benefit since it would substantially reduce, or perhaps even totally eliminate, the tremendous financial losses which occur when a major airport is shut down due to fog. These losses, which may run into the hundreds of thousands of dollars or more per day, include such items as loss of passenger revenue, loss of freight revenue, additional fuel consumption, additional aircraft and ground crew salary loss and others.

A primary feature of the present air treatment apparatus which renders the latter practical and capable for the described uses resides in the lightweight, low cost, inflatable construction of the air treatment chamber 12. This chamber construction permits the latter to be made sufficiently large to handle the large volumes of air required for effective atmospheric depollution applications. In other words, the air treatment chamber may be made sufficiently large to accommodate the high volumetric air flow rates and provide the prolonged residence time of the air within the chamber required for such applications. Also, the present air treatment apparatus in general, and the treatment chambers in particular, is so low in cost, readily portable, and easily installable as to permit a relatively large number of units to be installed in any given location and thereby establish a total air treatment capability of the magnitude required for large scale atmospheric depollution applications. By way of example, air treatment or depollution apparatus according to the invention can be designated to deliver up to 1,000,000 cubic feet of clear air per minute. This means that 10 such units can clean a square mile of air 500 feet high in just 24 hours. Moreover, the use of an inflatable dome for the basic enclosure makes the entire system economically feasible. A 1,000,000 CFM unit, for example, may cost on the order of only $15,000.00 with average equipment. It is completely portable. A 1,000,000 CFM unit can be set up ready to operate within 2 hours from time of delivery. Any level area — on the ground or on a roof — 50 feet by 150 feet will accommodate the treatment chamber and necessary equipment.

Another advantage of the present air treatment apparatus resides in the fact that it may be readily disassembled and collapsed for transportation from one location to another. Also, when collapsed, the apparatus may be conveniently stored.

What is claimed is:

1. Apparatus for washing atmospheric air to remove the impurities therefrom, comprising:
    an inflatable chamber having a wall constructed of a thin resilient plastic film, an inlet through which said air is introduced into the chamber under pressure means to inflate the chamber, and an outlet through which the washed air is exhausted from the chamber,
    air washing means within said chamber positioned between said inlet and said outlet for intimately mixing a liquid with said air as it flows through said chamber to remove said impurities therefrom and powered means for inducing the flow of air from the atmosphere into said inlet under sufficient pressure to maintain said chamber inflated.

2. The apparatus defined by claim 1 wherein said air washing means comprise a plurality of nozzles adapted to discharge concentrated sprays of water across the flow path of the air through the chamber between said inlet and outlet, means for collecting said water in the bottom of said chamber, and pumping means for returning said water under pressure from said collecting means to said nozzles.

3. Gas treatment apparatus according to claim 1 wherein:
    said gas is atmospheric air,
    said treatment chamber is contained within a ravine in the ground, such as a natural wash or artificial storm drain, and
    said inlet and outlet open to the atmosphere.

4. Gas treatment apparatus according to claim 1 wherein:
    said gas is atmospheric air,
    said treatment chamber is contained within a subterranean tunnel, such as a sewer tunnel, having openings to the atmosphere, and
    said inlet and outlet communicate to the atmosphere through said openings.

5. The method of removing impurities from the air comprising the steps of:
    providing an inflatable tunnel constructed of a thin resilient plastic film and having an inlet from the atmosphere into the interior of said tunnel and an outlet from the interior of said tunnel to the atmosphere,
    inducing a flow of air from the atmosphere containing impurities through said tunnel from said inlet to said outlet at a pressure sufficient to inflate said chamber,
    intimately mixing a liquid with said air flowing through said chamber to remove said impurities and discharging the air with the impurities thus removed through said outlet.

6. The method defined by claim 5 wherein said gas is washed by means of a plurality of nozzles adapted to direct concentrated sprays of water across the flow path of air through said tunnel.

* * * * *